Dec. 30, 1969   J. LINDSAY   3,487,133
METHOD FOR MAKING RELIEF MAPS
Filed Feb. 20, 1967

INVENTOR.
JOHN LINDSAY
BY
Sheridan and Ross
ATTORNEYS

United States Patent Office 3,487,133
Patented Dec. 30, 1969

3,487,133
METHOD FOR MAKING RELIEF MAPS
John Lindsay, 55 Lipan St., Denver, Colo. 80223
Filed Feb. 20, 1967, Ser. No. 617,274
Int. Cl. B29c 1/02, 1/14, 17/02
U.S. Cl. 264—40
14 Claims

ABSTRACT OF THE DISCLOSURE

The invention is a method for making a relief map or a mold from which a relief map can be reproduced and comprises reproducing the flat map on a sheet of thermoplastic material, supporting the sheet in a frame, heating areas on the sheet which are to be deformed and forming the heated areas to represent scaled contours, the product itself serving as a relief map or as a mold form for reproducing the relief map.

---

Figure 1:
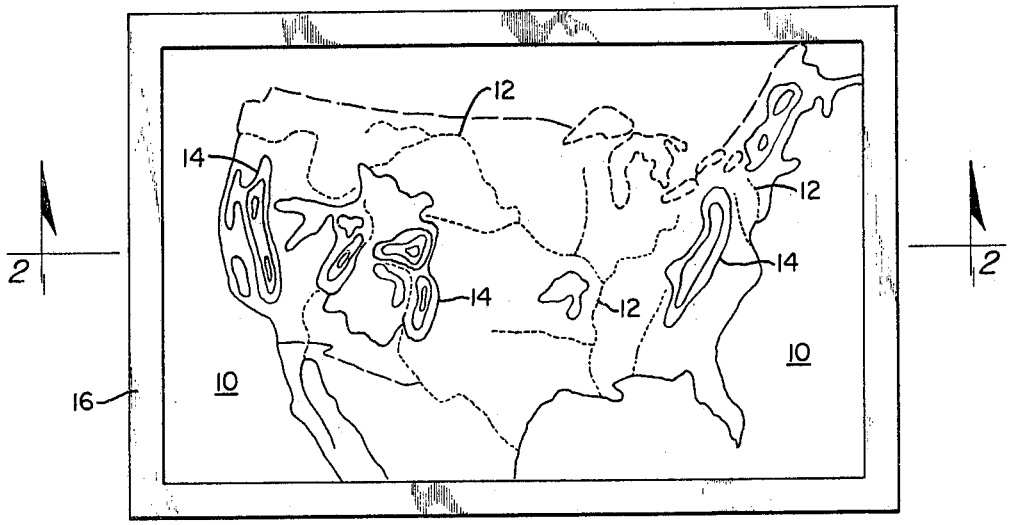

This invention relates to an improved process for making relief maps and molds used in making relief maps.

Prior to this invention, two principal methods for making relief maps had been used. In accordance with one prior art method involving a photographing step, the map is marked or printed on a ductile, translucent or transparent sheet of material, the sheet placed on a resilient surface, contours representing land drainage features made by indenting areas where these features appear on the map, the sheet reversed and contours representing watershed features made in other areas of the map where the latter features appear, and the resulting model sheet photographed with oblique lighting.

In accordance with another prior art method, a model or mold of the map having thereon built-up portions representing contours on corresponding areas of the map is made, the model or mold placed in a vacuum forming machine and blank plastic sheets heated and formed over it. Relief map details are drawn onto each formed sheet by hand, the sheet removed and re-heated to flatten it out to form a distorted layout of the details from which silk screens or printing plates can be developed.

The chief disadvantage to the first method outlined above is that an accurate reproduction cannot easily be produced in which the relative three dimensional areas are accurately presented and elvations cannot be changed or corrected in the original form. The second method referred to is subject to the disadvantages that any misregistry or mistakes in the terrain layout require costly corrective handwork on the mold or the distorted map. Further, heating and re-heating of the entire plastic sheet is a trial and error method which requires many time-consuming trials to accurately locate terrain features. Additionally, plates or screens made to print flat maps cannot be used to print three dimensional maps made by this method because of the distortion factor inherent in the system. Also, the method is costly because the mold and plates must be completely constructed as prototypes for inspection, and errors made in drawing in the relief map details may require entirely new molds and plates to be constructed.

Accordingly, it is an object of this invention to provide a method for making relief maps in which three dimensional contours are accurately and uniformly reproduced to a relative scale as compared to each other and as compared to the contour intervals on the original map, and changes or corrections can be easily made in the original form until extreme accuracy is obtained.

It is another object of this invention to provide a method for making relief maps involving the production of a mold, in which the mold is formed to register with a printed map rather than a map designed to register with a mold;

It is another object of this invention to provide a method for making relief maps in which a prototype of the map is available for review and correction before the final mold and plates are manufactured and any corrections may be easily made on the original prototype;

It is a further object of this invention to provide a method for making three dimensional maps including the step of making relief in thermoplastic sheet to represent contours, in which such forms are accurately gauged during formation to correspond in relative dimensions to contours on the basic map.

In accordance with the invention, the map to be put into relief is reproduced on a single or multiple ply sheet of thermoplastic material, the sheet mounted in a frame, heat applied successively to areas on one side of the sheet to be contoured while individually deforming the areas from the same or opposite sides by means of a tool. A mold is then made from the formed sheet and relief maps reproduced from the mold.

Figure 2:
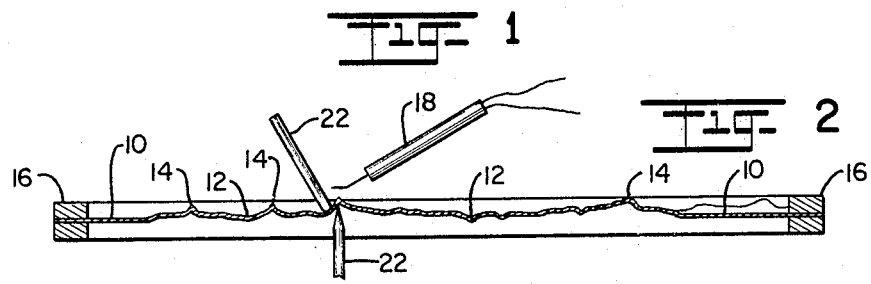
Figure 3:
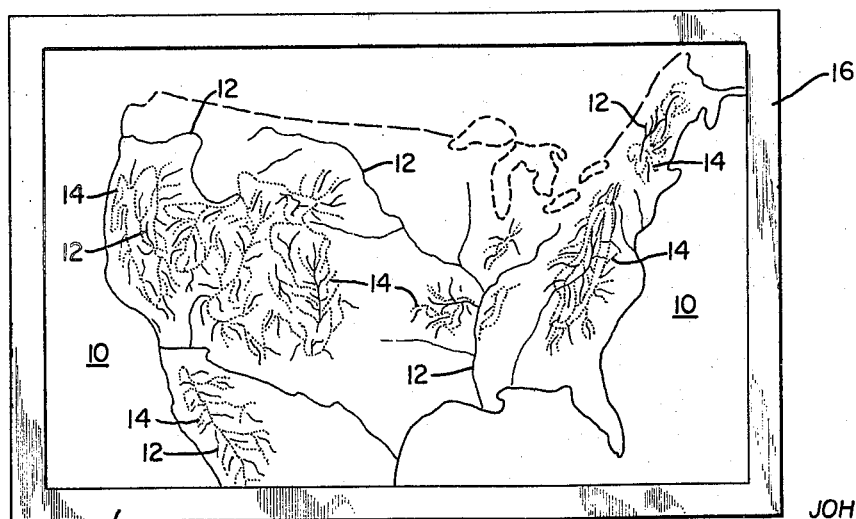

The invention will now be explained with reference to the accompanying drawings in which:

FIG. 1 is a plan view of a final reproduction of a map to be produced in relief;

FIG. 2 is a sectional view of the assembly of the sheet of FIG. 1 in a frame in the process of forming relief by raising or deforming areas, and showing formed contours; and FIG. 3 is a plan view of the sheet of FIG. 1 showing it after outlines have ben raised to illustrate outstanding high or watershed features, such as, high mountains and plateaus while rivers, lakes or water areas are left in relative base plane position.

Referring now to the drawings; in FIG. 1 the numeral 10 represents a thermoplastic sheet such as a vinyl, styrene, or acetate plastic available on the market. It must be thermoplastic so that it can be formed when heated. The thickness of the sheet is not critical. The numeral 12 referring to dotted lines represents low areas or land drainage areas, such as, rivers, valleys, lakes, etc.; and the numeral 14 indicates high areas or watershed areas such as mountain ranges, etc.

In the operation of the method, the area to be produced in relief is reproduced on sheet 10. In the preferred embodiment one or more thermoplastic sheets may be used with the first sheet 10. There are two main advantages in using multiple sheets. If only one map is printed on plastic, unprinted sheets may be placed in the frame along with the printed sheet. After the forming process, the unprinted formed blanks may be used to make the mold, thus saving the printed sheet. If multiple maps are to be formed by the hand forming method, multiple printed sheets may be placed in registry in the frame and formed together, thus producing multiple hand formed maps.

The single or multiple sheets with the map reproduced on one side are registered, if necessary, and mounted and stretched in frame 16 (FIG. 2) in position for the operation of forming contoured outlines thereon.

In performing the first operation, the specific area of the stretched sheet which is to be molded to represent a raised contour is heated on one side by heating tool 18 to render it formable. Simultaneously, a forming tool 22 is applied to either side to raise the contoured area as shown in FIG. 2. The heating step is essential to give the plastic sufficient plasticity to permit accurate forming. The action of the plastic and its relative deformation is observed under heat and pressure. This permits the operator to judge the amount of pressure required and the location of the deformation.

The bluntness or sharpness of the forming tool will, of course, be dictated by the sharpness of the contoured area being reproduced. The height of the contour can be gauged by means of a suitable gauging tool which is constructed for movement along the face of the sheet.

The amount of the distortion may be gauged while the sheet is hot and while the tool is being used to form the relief. The number of raised portions made will correspond to the number of contours on the map and the formations made in the first operation may represent both the low and high areas. In the illustrated embodiment, as shown in FIG. 3, the relief represents the complete three dimensional system of the map being reproduced.

The forming tool may be applied from either side of the sheet to raise higher sections such as mountains or to make lower sections such as lakes and rivers. If a correction is to be made or an elevation changed, the area is heated a second time. Upon heating the plastic in the stretched condition, the heated area will return to the flat condition because of the memory properties of the plastic. At this time relief portions can be reformed to the corrected height or relocated to the proper position in the prescribed manner. By this method unlimited corrections can be made and extreme accuracy achieved. The correction feature made possible by the factors of stretching individual areas, with heating, and through the memory properties of the plastic, is an important feature of the invention, and the accuracy and detail achieved with this this system is not incorporated in any other system.

If only one contour map is desired, the operation is complete and a three dimensional map hereafter referred to as the base map has been produced. However, if multiple contour relief maps are required, the method includes the forming of a mold from which to make additional maps.

A mold is formed from the contoured product by using the base map as a form without removing the base map from the frame. The frame is mounted in horizontal position and the mold material poured over the formed sheet. A male or female mold may be formed depending upon which side of the formed sheet is used for the mold form.

Various types of conventional mold material may be used; however, a preferred material is a U.S. Gypsum product known as Hydrocal No. 60, which is available on the market. This material is used by many pattern shops and mold makers and it holds detail, does not shrink and possesses great strength in its hardened state. In making the mold it is preferred to back the side of the formed sheet not being used to make the mold with light sand to give the sheet support while the mold material is poured. Plywood or hard board cutouts may be used for large flat areas, such as, oceans bordering the map and the mold material poured into or around these areas. Then, if a female mold is required, the sand is removed and the mold poured using the other side of the form before the male mold is removed from the opposite side so that in this instance it provides a support.

The mold formed is now ready for use to produce the relief maps. The result of the process is a mold which is accurately registered with a printed map. When production maps are produced from this mold the same material and thickness will be used as for the original base map. The base map has been formed by controlled heating and stretching of a thermoplastic sheet. The mold is registered to this base map. Therefore, any future maps formed from this mold will be in registry because the deformation of the plastic under heat has been predicted in the making of the base map. Better registry of the mold to the map is achieved by this process than any other cold work process and this is an important and essential feature of this invention.

For extreme accuracy of registry and relief a trial mold may be used in the following described manner. The sample mold made as above is placed in a vacuum forming machine and several sample printed sheets formed from it. Hand grinding or filing may be accomplished on the mold at this time until the exact relief is obtained.

The best sample is replaced in the frame (16) as described. This sample can be gauged by the gauging tool and altitude corrections made by heating and retooling the area as described. Incorrect registery may be corrected by flattening the area in question with heating element 18 and reforming this area in its proper location. Also, irregularities in the operation of the material in the vacuum forming machine may be predicted and corrections made before a production run is started. A second mold is then formed from the corrected sample. As the mold material is inexpensive and the correction method simple, molds can be made economically and corrected until the exact relief and registry are produced.

The heating element 18 may be described as a handle to which is attached a resistance coil or wire that can be moved close to and over the plastic. The size and shape of the coil may be varied. The handle may have a safety guard to keep the element from burning the plastic. The heating element may be controlled and moved by hand like a pencil to heat large or small areas or may be operated by remote control on larger area maps. It may be constructed with a depth gauge to provide a combination heat source and height indicator. The heating element may be electrical but this does not preclude use of hot air or other heat sources for heating it.

For distorting the selected heated area of the sheet to form raised areas corresponding to contours on the map being reproduced in relief, the tool 22 must be constructed so that it will not tear or cut the sheet. The tool may be made of any suitable material and the material may be varied to take advantage of fast or slow heat absorption, thus providing different working conditions for the plastic. The tool may be shaped with a handle for ease of hand manipulation, or it may be remotely controlled for use under large surface areas. It may be incorporated into the same remotely controlled system as the heat element 18. It may be spring-loaded to control the pressure exerted and may be guided to control the direction of thrust and of travel.

The gauging element or tool used for determining the relative heights of the contoured areas may take various forms. A preferred tool is one mounted on one side of the frame with an adjustable arm extending over the work carrying a gauge member mounted at its end for gauging the work. The arm is mounted and constructed so that it is adjustable in one horizontal plane to permit positioning of the gauge on any area of the map. The gauge member is preferably mounted to be slidable vertically in the end of the arm so that it can be adjusted vertically to accommodate various heights of contours. The depth scale may be variable to provide for different scales on different maps and the zero or base point. The reading on the gauge during the distortion is a feature of the system that develops extreme accuracy of relative heights and simplicity of operation. It is dependent on the heating of the individual areas, the working of these areas with a tool during plasticity, and with the gauge member resting on the heated plastic while the tool supports the sheet from underneath. The heat may be removed at the exact height desired and the plastic will set in this position. This is an important feature of this invention and a feature not incorporated in other systems.

The method described provides a number of apparent advantages. Small scale maps in accurate detail which cannot be produced except through prior hand methods of forming a mold can be readily and inexpensively produced by this method. The map to be reproduced in relief form can be printed directly on the plastic from printing plates used to print paper maps. If a run of paper maps is on a press, plastic sheets may be printed at the same time after which a mold can be made to register with the maps as described. Thus, a group of paper and plastic maps can be run in one press setup, a considerable saving in money.

In the practice of this method a prototype or base map may be available for review and correction before expensive plates are made, in contrast to prior art methods in which no map was available for correction until after it had been made by distortion on a mold. A color proofing process such as Direct Reproduction Corporation's Watercote or Kwik-Cote may be used to economically reproduce a single map on vinyl plastic. This map may be formed into the base map as described. Also, if the mold is completed and the production maps show that there is an area too much out of registry to be acceptable, the rejected map can be stretched in the frame, corrections made as described, and a new mold poured from the revised form. This is relatively inexpensive. This same system can be used if a revision is necessary in the three-dimensional aspect of the map or to refine the details of an area while production is in process. Further, a change can be made at any time to show a new feature, and the old mold used to reproduce the former shape. If only a base map is needed, as a large display map, no mold is required.

While the method has been disclosed for use in connection with making relief maps, it is not restricted to this application as it can be adapted to the making of other type products where three-dimensional objects are required, such as, unusual shapes, globes, advertising display or tooling. The method is readily adaptable to quantity production of any prdouct in relief form.

It should be understood, of course, that the foregoing disclosure relates to only a preferred embodiment of the invention and that it is intended to cover all changes and modifications of the examples of the invention herein chosen for the purposes of disclosure which do not constitute a departure from the spirit and scope of the invention.

What is claimed is:

1. A method for making a relief map which comprises reproducing the map on a sheet of thermoplastic material, supporting said sheet by its edges without a backing support, heating one side of the sheet in a selected localized area only for deformation representing the contour to be made, and forming said selected localized area by exerting pressure thereon from the opposite side with a forming tool and in the absence of a backing support, measuring the relative dimension of the outline formed, allowing said localized area to cool before beginning deformation of another area, whereby as a result of many localized heating and forming applications of various heights and contours an entire area is developed.

2. The method of claim 1 in which the measurement is made at the time of the heating and during forming with the measuring device contacting the heated plastic on one side while pressure is applied with the tool from the other side.

3. The method of claim 1 in which outlines at different heights representing contours of different heights and representing drainage and water shed areas are made to scale by pressure of a tool from the same side of the sheet and with the use of said gauge member.

4. The method of claim 1 in which said deformation is made from either side of the sheet.

5. The method of claim 1 including the step of correcting errors in the plastic sheet which comprises reheating the areas to be corrected, each formed area being permitted to cool and set before continuing to another area to be corrected, and reforming them to make the corrections, whereby corrections are made by heating localized areas and reforming without interfering with correct aeras already formed and without removing the map from the frame.

6. The method for making a mold from which a relief map can be reproduced and reproducing relief maps therefrom which comprises: reproducing said map on a thermoplastic sheet of plastic having memory properties, supporting said sheet by its edges without a backing support, making relief forms in said sheet corresponding to contours on the map being reproduced by heating said sheet at localized areas where relief forms are to be made until it becomes pliable, and forming at least one of said heated localized areas into relief by application of pressure with a forming tool to the localized heated areas, each formed localized area being permitted to cool and set before continuing to another localized area, the relative heights of the contours formed being adjusted and measured to conform to the relative heights of corresponding contours on said map, whereby as a result of many localized heating and forming applications of various heights and contours an entire area is developed, and forming a mold using either side of said formed sheet as a mold form, and reproducing relief maps from said mold.

7. The method of claim 6 in which said sheet is mounted by its edges in a frame without a backing support before said relief forms are made and said mold is made from either side of said formed sheet while it is in said frame.

8. The method of claim 7 in which a mold is made from the side of said formed sheet not used as a mold while the formed mold supports said formed sheet from the other side.

9. The method of claim 6 including making from the formed mold of claim 6 a corrected mold having extreme accuracy of registry and relief which comprises first making a corrected mold form by forming a printed sheet from said formed mold of claim 7, mounting said printed plastic sheet by its edges in a frame in a stretched condition without a backing support, making altitude corrections in the stretched sheet by localized heating of the areas to be corrected to convert them to their flat condition and reforming the areas to be corrected with a forming tool, correcting errors in registy by localized heating of the areas out of registry to return them to their flat condition and reforming the areas out of registry in their correct location with a forming tool, each localized reformed area being permitted to cool and set before continuing to another localized area, whereby corrections are made by heating localized areas and reforming without interfering with correct areas already formed and without removing the map from the frame, making a mold from the formed corrected mold form, and repeating the above procedures until a final mold of extreme accuracy is obtained.

10. The method of making a relief map which comprises: reproducing said map on a substantially flat sheet of thermoplastic material; securing by its edges and tightly stretching said sheet in a frame without a backing support; making contours in said stretched sheet by heating said sheet at localized areas where contours are to be made until it becomes pliable; forming said localized heated areas into contours by application of localized pressure thereto from one side of the sheet; measuring the relative dimension of the formed contours; each formed localized area being permitted to cool and set before continuing to another localized area; the relative heights of the contours formed being adjusted to conform to the relative heights of corresponding contours on said map; whereby as a result of many localized heating and forming applications of various heights and contours an entire area is developed.

11. The method of making a relief map which comprises: reproducing said map on a substantially flat sheet of transparent or translucent thermoplastic material; securing said sheet by its edges in a frame in a tightly stretched condition without a backing support; heating localized areas of said sheet representing relief areas; forming said heated relief areas into contours of accurately scaled relative heights by means of pressure from a forming tool on one side of said sheet; measuring the relative dimension of said formed contours; each formed localized area being permitted to cool and set before continuing to another localized area; said contours being formed by pushing said relief areas out of the plane of the sheet in the same direction, the relief areas representing by their relative heights the relative heights of the land areas represented on said map; whereby as a result of many localized heating and forming applications of various heights and contours an entire area is developed.

12. The method of making corrections in a translucent thermoplastic map which comprises: securing said map by its edges on a frame in a tightly stretched condition without a backing support; heating localized areas of said map to be corrected; forming said heated areas to the corrected form; measuring the relative dimension of said formed areas; each formed or corrected area being permitted to cool and set before continuing to another area to be corrected; whereby corrections are made by heating localized areas to be corrected and reforming into the corrected form without interference with correct areas already formed and without removing the map from the frame.

13. A method for making a relief map which comprises reproducing the map on a sheet of thermoplastic material, supporting said sheet by its edges without a backing support, heating one side of the sheet in a selected localized area only for deformation representing the contour to be made, and forming said selected localized area by exerting pressure thereon from the opposite side with a forming tool and in the absence of a backing support, allowing said localized area to cool before beginning deformation of another area, whereby as a result of many localized heating and forming applications of various heights and contours an entire area is developed; correcting errors in said formed relife map of thermoplastic material which comprises: reheating the areas to be corrected, and reforming them to make the corrections, whereby corrections are made by heating localized areas and reforming without interfering with correct areas already formed and without removing the map from the frame.

14. The method for making a mold from which a relief map can be reproduced and reproducing relief maps therefrom which comprises: reproducing said map on a thermoplastic sheet of plastic having memory properties, supporting said sheet by its edges without a backing support, making relief forms in said sheet corresponding to contours on the map being reproduced by heating said sheet at localized areas where relief forms are to be made until it becomes pliable, and forming at least one of said localized areas into relief by application of pressure with a forming tool to the localized heated areas, the relative heights of the contours formed being adjusted to conform to the relative heights of corresponding contours on said map, whereby as a result of many localized heating and forming applications of various heights and contours an entire area is developed, forming a mold using either side of said formed sheet as a mold form, correcting errors in said mold formed from said plastic sheet comprising; reheating the areas to be corrected, and reforming them to make the corrections, whereby corrections are made by heating localized areas and reforming without interfering with correct areas already formed and without removing the map from the frame.

References Cited

UNITED STATES PATENTS

| 576,047 | 1/1897 | Fairchild | 35—41 |
| 2,468,731 | 5/1949 | Borkland | 35—41 XR |
| 3,077,040 | 2/1963 | Stiebor | 35—46 |

FOREIGN PATENTS

| 742,937 | 1/1956 | Great Britain. |
| 87,424 | 3/1956 | Norway. |
| 313,586 | 6/1956 | Switzerland. |

ROBERT F. WHITE, Primary Examiner

R. R. KUCIA, Assistant Examiner

U.S. Cl. X.R.

35—41; 214—219; 264—291, 296, 322